(12) United States Patent
Domer et al.

(10) Patent No.: US 6,346,968 B1
(45) Date of Patent: Feb. 12, 2002

(54) COLOR BALANCING CIRCUIT AND METHOD

(75) Inventors: Steven M. Domer, Mesa; Robert C. Cichomski, Chandler, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/921,965

(22) Filed: Sep. 2, 1997

(51) Int. Cl.⁷ .................................................. H04N 9/73
(52) U.S. Cl. ...................................... 348/223; 348/229
(58) Field of Search ............................... 348/222, 223, 348/224, 228, 229, 230, 241, 243, 254, 255, 674, 675, 518, 519; H04N 9/73

(56) References Cited

U.S. PATENT DOCUMENTS

| | | | |
|---|---|---|---|
| 5,223,921 A | * | 6/1993 | Haruki et al. ................ 348/255 |
| 5,267,026 A | * | 11/1993 | Kawahara et al. ........... 348/255 |
| 5,319,449 A | | 6/1994 | Saito et al. |
| 5,329,361 A | | 7/1994 | Matsui et al. |
| 5,539,456 A | | 7/1996 | Ishii |
| 5,606,630 A | | 2/1997 | Maeda et al. |
| 5,736,886 A | * | 4/1998 | Mangelsdorf et al. ....... 348/241 |
| 6,025,875 A | * | 2/2000 | Vu et al. ..................... 348/241 |
| 6,147,707 A | * | 11/2000 | Terasawa et al. ........... 348/229 |

* cited by examiner

Primary Examiner—Tuan Ho

(57) ABSTRACT

A circuit and method color balance pixel signals ($V_{PIXEL}$) on-the-fly in an image capturing system (10). The pixel signals are amplified in a programmable gain amplifier (204) whose gain is set by the ratio of a programmable capacitor (320, 330) to a fixed capacitor (310, 311). Control data (CONTROL) sets the capacitance of the programmable capacitor by enabling switches (323–324, 333–334) that enable binary weighted capacitors (321–322, 331–332). The control data adjusts the gain of the programmable amplifier as each pixel signal is applied, so that the pixel signals of all primary colors are amplified in the same programmable gain amplifier.

9 Claims, 2 Drawing Sheets

COLOR BALANCING CIRCUIT AND METHOD

BACKGROUND OF THE INVENTION

The present invention relates in general to integrated circuits and, more particularly, to a color balancing circuit for processing imaging signals.

High-resolution image capturing systems typically capture an image by projecting light from the image onto an array of semiconductor photoactive sensing devices such as charge-coupled devices, p-i-n diodes or phototransistors. Such arrays operate at low power and are easily integrated on a semiconductor die, and so are ideal for use in portable equipment such as digital cameras and scanners. Each photoactive sensing device converts the light to a pixel signal. The system output provides image data containing intensity and color information for each pixel signal in a format displayable by a display device.

Image colors are separated into three or four component primary colors by interposing a matrix of optical color filters between the image and the sensing array such that light of substantially one primary color reaches each photoactive device. For example, a system based on red, green and blue primary colors is commonly known as an RGB system which uses a matrix of red, green and blue color filters. Hence, each photoactive device senses light of one primary color to produce a pixel signal representing the primary color as well as the intensity of the light. The primary colors are blended by the display device to reproduce the other colors of the image. Where the display device is a high definition television, pixel signals are generated at a rate of at least 27.0 megahertz.

On most systems, the response of photoactive devices to their respective primary colors is unbalanced, often due to the color filters. For example, devices that sense red light may produce pixel signals of greater amplitude than devices sensing blue light of the same intensity. If the color imbalance is not corrected, the image is not displayed with accurate colors.

To correct for the differences in color sensitivity, pixel signals of different primary colors are amplified by different gains to color balance the pixel signals. Prior art systems perform such color balancing by amplifying the pixel signals of each primary color in a different amplifier set to the appropriate compensating gain. For example, to color balance a red pixel signal generated by red light and having twice the amplitude of a blue pixel signal generated by blue light of equal intensity, the blue pixel signal is amplified in one amplifier having twice the gain as another amplifier that amplifies the red signal. Such multiple amplifier color balancing suffers from image display artifacts such as fixed pattern noise due to mismatches among the amplifiers. Such artifacts are difficult or impossible to identify and correct.

Hence, there is a need for an improved circuit and method of color balancing pixel signals to compensate for differences in the color response of photoactive sensing devices.

DETAILED DESCRIPTION OF THE DRAWINGS

Figure 1:
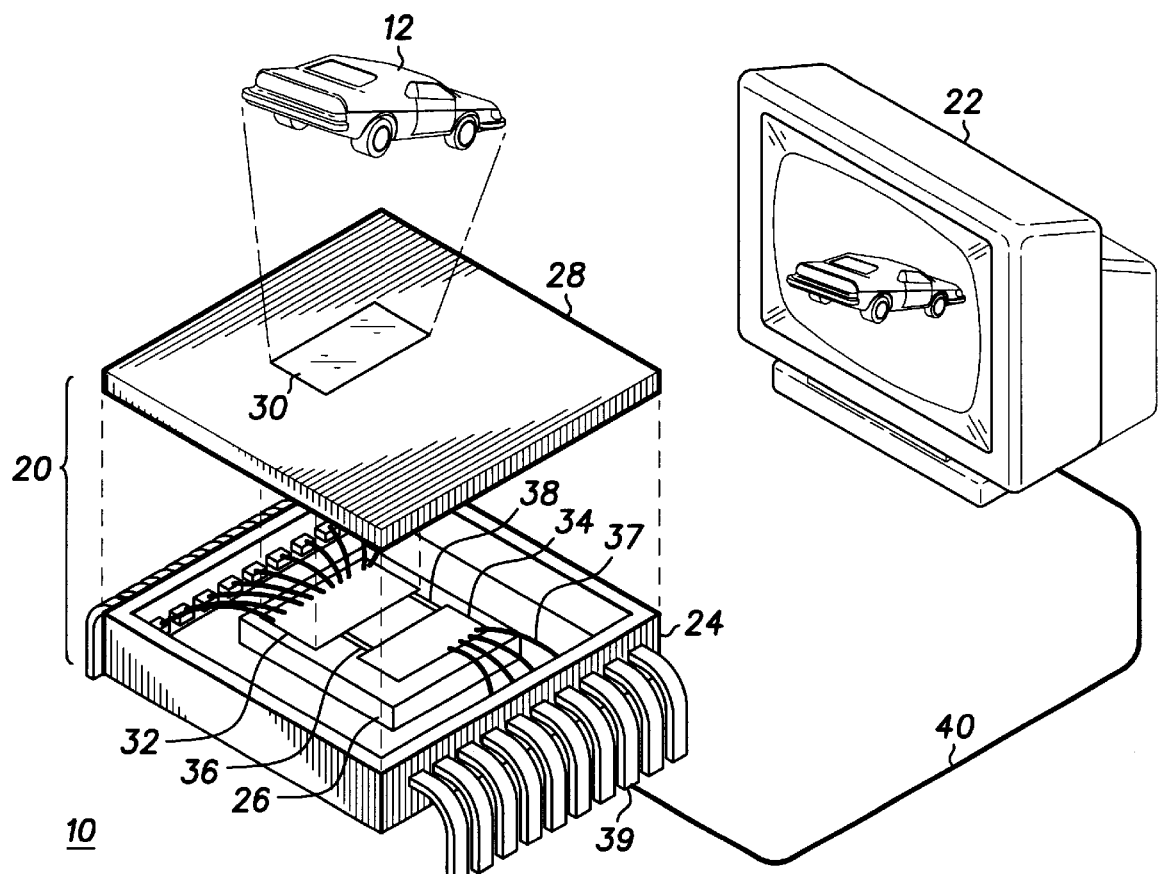
FIG. 1 is an isometric view of an image capturing system.

FIG. 1 is a partially exploded isometric view of an image capturing system 10 including an image capture device 20 and an output device 22. Image capturing system 10 captures an image 12 for converting to digital data in a format recognizable for displaying by output device 22, as described below.

A package 24 for housing an imaging integrated circuit 26 is enclosed by a lid 28 having a transparent portion 30 for projecting image 12 onto a region 32 of integrated circuit 26 which includes an optical sensing array. The transparent portion is fabricated to operate as a focusing lens or, in the alternative, focusing is achieved with an external lens interposed between image 12 and region 32. The optical sensing array is organized as a matrix of photoactive semiconductor devices such as charge-coupled devices, phototransistors or p-i-n diodes functioning as pixel sensors. Light is projected through a matrix of color filters (not shown) such that each photoactive device produces an analog pixel signal indicative of the intensity and color of the projected light. Region 32 further includes circuitry for selecting pixels in a predefined order to produce a stream of analog pixel signals on an output conductor 36.

A region 34 of integrated circuit 26 includes a signal processing circuit which processes the pixel stream to produce digital output data coupled through wire bond 37 and a lead 39 of package 20 to output device 22. Although the output signal is shown in FIG. 1 as being provided on a single lead to simplify the figure, in most applications the output data is provided on a bus to multiple leads of package 20. Control signals such as clock and address signals are provided on a conductor or bus 38 by circuitry in region 34 to control the electrical operation of the sensing array of region 32.

Output device 22 is shown as a monitor, but can be another type of device such as a printer, a storage device such as a disk drive, etc. In a wireless communications device such as a pager or portable telephone, image capturing system 10 provides a modulation signal for broadcasting image 12 to a receiver. Hence, output device 22 can include a radio frequency oscillator to provide a carrier signal, a modulator for modulating the carrier signal with the output data and an antenna for transmitting the modulated carrier signal.

Figure 2:
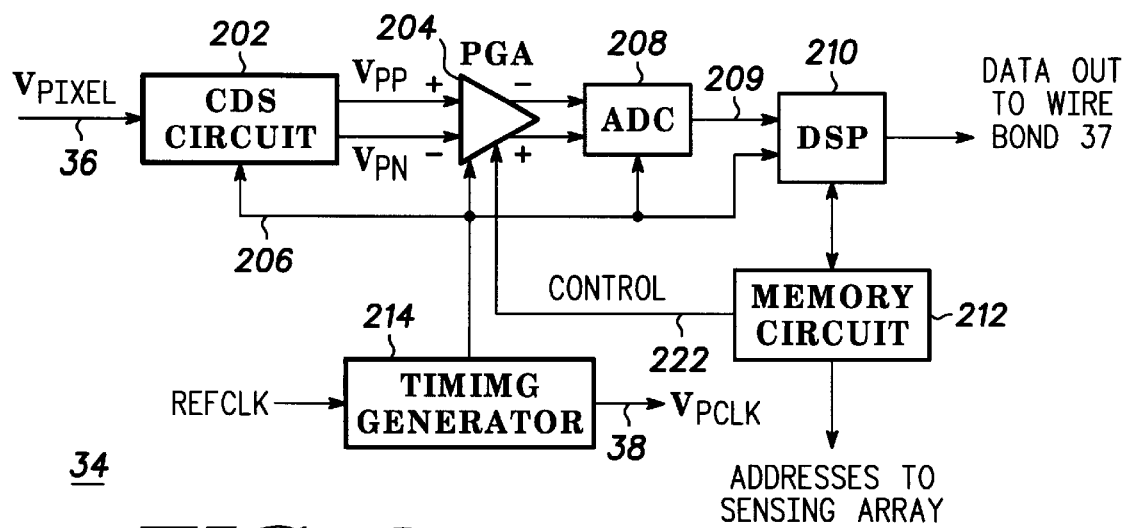
FIG. 2 is a block diagram of signal processing circuitry.

FIG. 2 is a block diagram of the signal processing circuit of region 34, including a correlated double sampling (CDS) circuit 202, a programmable gain amplifier (PGA) 204, an analog-to-digital converter (ADC) 208, a digital signal processor (DSP) 210, a memory circuit 212 and a timing generator 214. In the figures, elements having the same reference numbers provide similar functions. A pixel stream $V_{PIXEL}$ operating at a 27.0 megahertz is received on conductor 36. $V_{PIXEL}$ includes analog pixel signals whose amplitudes indicate the amount of light projected onto the photoactive sensing devices in the optical sensing array.

Because the structure of the color filter matrix is known, the photoactive devices can be mapped to their respective primary colors during device fabrication and the mapping data stored in a color lookup table or the like in memory 212. The lookup table includes the address of each photoactive device along with associated color information. In more complex systems, the physical location of each photoactive device within the array is also mapped and stored in the lookup table. DSP 210 controls access to the photoactive devices through the lookup table to produce $V_{PIXEL}$ as a color-interleaved stream of pixel signals.

CDS circuit 202 operates as a switched capacitor sample-and-hold circuit which uses a standard correlated double sampling technique to sense each pixel signal twice, the first time to establish a reference voltage and the second time to produce a pixel voltage. The reference and pixel voltages are subtracted to produce a proportional differential output signal $V_{PP}$–$V_{PN}$. Such differential signals increase noise immunity and the dynamic range of the system, which is especially important in portable equipment operating from a low battery supply voltage. CDS circuit 202 typically provides a voltage gain to maximize the dynamic range within a given power supply voltage. For example, in one embodiment used in a portable communications device operating from a battery supply voltage $V_{DD}$=2.8 volts, CDS circuit 202 provides a voltage gain of about 1.5.

Timing generator 214 receives a reference clock signal REFCLK operating at 13.5 megahertz and derives clock signals which are provided on a bus 206 for synchronizing operations of the image capture circuit. For example one clock signal can be frequency synthesized using a voltage controlled oscillator to operate at 216.0 megahertz to set the time slots during which $V_{PIXEL}$ is sampled by CDS circuit 202. A pixel clock signal $V_{PCLK}$ operating at 27.0 megahertz is provided on conductor 38 to control the pixel rate of the optical sensing array.

PGA 204 provides a digitally programmable gain to adjust the color balance of pixel signals of $V_{PIXEL}$ to compensate for the different color sensitivities of photoactive devices. Color balance is often referred to as white balance because white light includes all colors of light in equal intensities. Hence, when the pixel signals of a captured white image are color balanced, the pixel signals have equal amplitudes regardless of their primary colors and the white image is correctly displayed. When pixel signals are not color balanced, the image is not displayed with accurate colors, so that a white image is displayed as a color other than white.

Prior art color balancing circuits separate the pixel signals by their primary colors for routing through multiple parallel amplifiers. However, such amplifiers are difficult to match to the degree necessary to prevent image display artifacts such as fixed pattern noise. The present invention avoids this problem by generating $V_{PIXEL}$ as a single stream of pixel signals whose primary colors are interleaved for serially amplifying through a single amplifier. Color balancing is achieved by adjusting the gain of PGA 204 with CONTROL data mapped to each pixel signal and stored in the lookup table of memory 212. DSP 210 synchronizes the CONTROL data to the corresponding pixel signal and produces the CONTROL data on a bus 222 to the control input of PGA 204. Hence, the gain is adjusted on-the-fly to compensate for color imbalance as the colors of the pixel signals change.

ADC 208 is a switched capacitor pipelined ADC that converts the analog output signal from PGA 204 to representative imaging data on bus 209. A sufficiently high data rate is ensured by configuring bus 209 to have at least as many conductors as there are bits in the digital data produced by ADC 208. Thus, for eight-bit digital data, bus 209 has at least eight conductors.

DSP 210 includes a microprocessor with support circuitry or similar software executable logic circuits to convert the imaging data from ADC 208 to output data in a predefined format that can be read and/or displayed on output device 22. DSP 210 can also execute a variety of other imaging operations, such as gamma correction, image noise filtering, pixel cluster averaging, color deepening, contrast enhancement, and data compression. The software instructions for operating DSP 210 are stored in a region of memory 212 operating as read-only or random access memory.

DSP 210 controls the addressing of the optical sensing array and uses the lookup table in memory 212 to track the primary colors of $V_{PIXEL}$ through each stage of pixel signal processing. For each pixel signal at each processing stage, DSP 210 knows the color and physical location of the originating photoactive device within the array. DSP 210 controls color balancing by addressing a photoactive device through the lookup table and providing the corresponding CONTROL data when the pixel signal is applied to PGA 204. By taking advantage of physical location information, DSP 210 can compute more refined CONTROL data to make other types of compensating adjustments to the gain of PGA 204. For example, DSP 210 can correct for optical imperfections such as reduced light exposure at the periphery of the sensing array by increasing the gain of pixel signals generated by peripherally located photoactive devices. As a further example, DSP 210 can be programmed to compute light levels from the imaging data to adjust the overall gain of PGA 204 to compensate for dim lighting conditions, thereby providing electronic exposure control. Such computations are typically too complex to be performed on each cycle of $V_{PIXEL}$, so the results are updated in a buffer register in memory 212 linked to the lookup table for providing the CONTROL data at the pixel rate.

Memory 212 is implemented as a read-only or random access array of storage devices which store the lookup table, buffer register and software instructions and data used by DSP 210. While memory is accessed at the 27.0 megahertz frequency of $V_{PIXEL}$ but can be updated at a slower rate to allow DSP 210 to complete computation such as those described above to enhance the appearance of the image on output device 22. In some systems, the user-provided color balancing or other data is stored in memory 212 through an external input (not shown) of either memory 212 or DSP 210.

Figure 3:
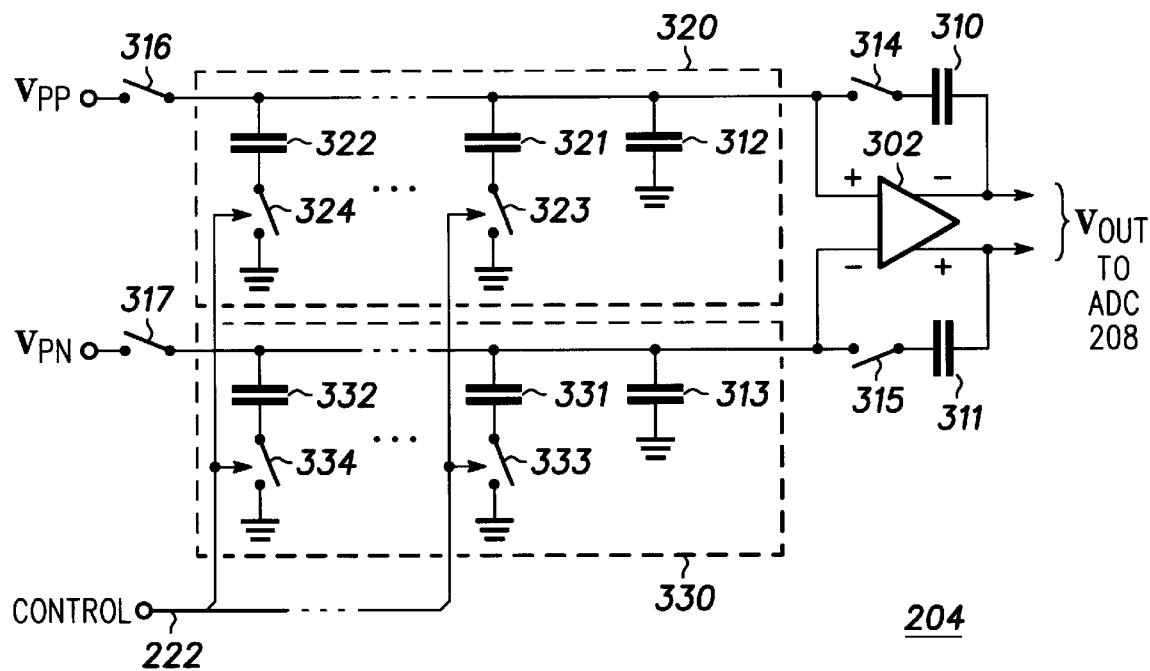
FIG. 3 is a schematic diagram of a programmable gain amplifier.

FIG. 3 is a schematic diagram of PGA 204, a switched capacitor, pipelined programmable gain stage, including an amplifier 302, fixed capacitors 310–311, programmable capacitors 320 and 330, and switches 314, 315, 316, 317, 323–324 and 333–334. PGA 204 amplifies the stream of pixel signals in $V_{PIXEL}$ to produce a color balanced imaging signal $V_{OUT}$ which is applied to the input of ADC 208. Typically, capacitors 310 and 311 are matching capacitors and programmable capacitors 320 and 330 are matching capacitors. The gain of PGA 204 is set by the ratio of capacitances of programmable capacitor 320 and capacitor 310. Capacitors can be matched more accurately than amplifiers, so the single amplifier approach of present invention color balances pixel signals without introducing the fixed pattern noise and other display artifacts which characterize prior art multiple color balancing amplifiers. Moreover, a single amplifier configuration uses less power and die area than the multiple amplifiers of prior art systems.

Other embodiments besides matching capacitors can alternatively be used without departing from the scope of the present invention. For example, a continuous mode operational amplifier can use programmable resistors to set the gain with control data.

Programmable capacitor 320 comprises an array of binary weighted capacitors controlled by associated switches that close in response to the CONTROL data. In order to simplify the description, only capacitors 321–322 and associated switches 323–324 are shown. Similarly, programmable capacitor 330 comprises an array of binary weighted capacitors controlled by associated switches that are enabled in response to the CONTROL data, but only capacitors 331–332 and associated switches 333–334 are shown. Because most systems require at least eight bits of programmability to accurately color balance pixel signals, programmable capacitors 320 and 330 typically include eight binary weighted capacitors associated with eight switches that are enabled in response to eight bits of CONTROL data. In general, if N bits of accuracy are needed, where N is an integer, programmable capacitors 320 and 330 include N binary weighted capacitors and switches enabled by N bits of CONTROL data. Where CONTROL data is not configured as a binary representation of the desired gain, a decoder circuit (not shown) is used to convert CONTROL data to binary weighted form for controlling switches 323–324 and 333–334. The capacitances of programmable capacitors 320 and 330 are set by the combination of capacitors 321–322 and 331–332 whose associated switches 323–324 and 333–334 are enabled. Programmable capacitors 320 and 330 further include fixed capacitors 312 and 313, which establish minimum capacitances at the inputs of amplifier 302 to prevent excessive gain changes that reduce stability and introduce glitches at the output of amplifier 302.

Figure 4:
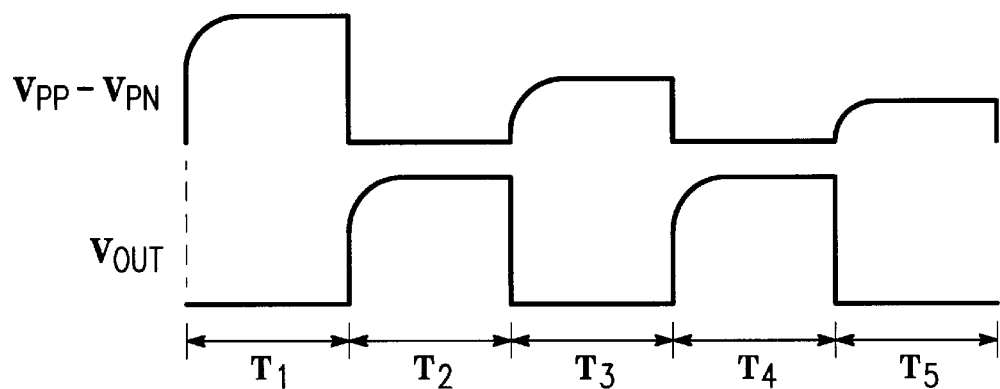
FIG. 4 is a timing diagram of the programmable gain amplifier.

The operation of PGA 204 is seen by referring to the timing diagram of FIG. 4, showing the input signal $V_{PP}$–$V_{PN}$ over two successive cycles (from two successive pixel-signals) of $V_{PIXEL}$ and the resulting color balanced imaging signal $V_{OUT}$. The first cycle of $V_{PP}$–$V_{PN}$ includes time periods $T_1$ and $T_2$ and the second cycle includes time periods $T_3$ and $T_4$. The first cycle of $V_{OUT}$ includes time periods $T_2$ and $T_3$ and the second cycle includes $T_4$ and $T_5$. Assume that the successive pixel signals are generated by equal intensities of white light with the first pixel signal ($V_{PP}$–$V_{PN}$ shown during $T_1$) representing a first primary color and having a greater amplitude than the second pixel signal ($V_{PP}$–$V_{PN}$ shown during $T_3$) representing a second primary color, as shown.

During $T_1$, the switches of programmable capacitors 320 and 330 are enabled by first CONTROL data from the lookup table in memory 212 to set the values of programmable capacitors 320 and 330. Switches 316 and 317 are closed to charge programmable capacitors 320 and 330 to the levels of $V_{PP}$ and $V_{PN}$, respectively. Switches 314 and 315 are open to put amplifier 302 in an autozero mode during which no output signal is provided. In one embodiment, capacitors 310 and 311 are discharged during this period by shorting both electrodes to ground using additional switches (not shown).

During $T_2$, CDS circuit 202 is in an autozero mode and switches 316–317 are opened to prevent programmable capacitors 320 and 330 from being discharged by CDS circuit 202. Switches 314–315 are closed to operate PGA 204 in a gain mode during which $V_{OUT}$ is valid.

During $T_3$ second CONTROL data from the lookup table of memory 212 enables a different combination of switches to set programmable capacitors 320 and 330 to a lower capacitance, which increases the gain of PGA 204 to color balance the pixel signals. Switches 316 and 317 are closed to charge programmable capacitors 320 and 330 to the levels of $V_{PP}$ and $V_{PN}$ respectively, while switches 314 and 315 are opened to operate amplifier 302 in an autozero mode.

During $T_4$, CDS circuit 202 is in the autozero mode, switches 316–317 are opened to prevent discharging programmable capacitors 320 and 330, and switches 314–315 are closed to operate PGA 204 in the gain mode during which $V_{OUT}$ is valid. The increased gain of PGA 204 produces a second $V_{OUT}$ signal (during $T_4$) whose amplitude is equal to the amplitude of the first $V_{OUT}$ signal, thereby compensating for the color imbalance of the pixel signals.

By now it should be appreciated that the present invention provides a circuit and method of color balancing pixel signals in an image capturing system. Pixel signals responsive to primary colors are interlaced in a signal stream and amplified in a single programmable amplifier. The gain of the amplifier is set with control data which adjusts the ratio of programmable capacitance to fixed capacitance in the amplifier. The control data is altered when the primary color of the signal being amplified changes, thereby altering the gain of the amplifier to color balance the pixel signals. Because capacitors are more accurately matched than amplifiers, the single amplifier configuration improves color balancing to produce more accurate image colors. In addition, fixed pattern noise and other imaging artifacts are reduced in comparison to prior art systems, while reducing power consumption and die area.

What is claimed is:

1. An imaging circuit, comprising:
   a storage device for storing control data;
   an amplifier having a first input coupled for receiving pixel signals that have not been separated by their primary colors, a first output for providing an imaging signal, and a control input coupled to an output of the storage device for receiving the control data to program a gain of the amplifier, where a first value of the control data sets the gain of the amplifier for a first pixel signal and a second value of the control data sets the gain for a second pixel signal to color balance the first and second pixel signals;
   a first capacitor coupled between the first input and first output of the amplifier; and
   a first programmable capacitor coupled for sampling the first and second pixel signals at the first input of the amplifier and having a capacitance set by the first value of control data when the first pixel signal is received and by the second value of control data when the second pixel signal is received.

2. The imaging circuit of claim 1, further comprising an optical sensing array including first and second photoactive devices responsive to first and second colors of an image to generate the first and second pixel signals, respectively, at an output of the optical sensing array.

3. The imaging circuit of claim 2, wherein the optical sensing array further includes a third photoactive device responsive to a third color of the image for generating a third pixel signal at the output of the optical sensing array, where the first, second and third pixel signals are applied successively to the first input of the amplifier and a third value of the control data sets the gain of the amplifier for the third pixel signal to color balance the first, second and third pixel signals.

4. The imaging circuit of claim 1, further comprising:
   a second capacitor coupled between the second input and a second output of the amplifier; and
   a second programmable capacitor coupled to a second input of the amplifier and having a capacitance set by the first value of control data when the first pixel signal is received and by the second value of control data when the second pixel signal is received, the imaging signal being provided across the first and second outputs of the amplifier.

5. The imaging circuit of claim 4, wherein the first and second capacitors are matched and the first and second programmable capacitors are matched.

6. The imaging circuit of claim 5, wherein the gain of the amplifier is determined by a ratio of a value of the first capacitor to the value of the first programmable capacitor.

7. The imaging circuit of claim 1, further comprising an analog to digital converter (ADC) having a first input coupled for receiving the imaging signal and an output for providing imaging data indicative of the imaging signal.

8. The imaging circuit of claims 7, further comprising a digital processing circuit having a first input coupled to the output of the ADC and a first output for altering a format of the imaging data to produce output data.

9. The imaging circuit of claim 8, wherein the digital processing circuit has a second out put coupled to an input of the storage device for providing the first and second values of control data mapped to first and second colors represented by the first and second pixel signals.

* * * * *